United States Patent
Hayashida

(10) Patent No.: US 10,374,437 B2
(45) Date of Patent: Aug. 6, 2019

(54) POWER-SAVING CONTROL METHOD AND POWER-SAVING CONTROL SYSTEM

(71) Applicant: Panasonic Corporation, Osaka (JP)

(72) Inventor: Gaku Hayashida, Osaka (JP)

(73) Assignee: PANASONIC CORPORATION, Osaka (JP)

(*) Notice: Subject to any disclaimer, the term of this patent is extended or adjusted under 35 U.S.C. 154(b) by 0 days.

(21) Appl. No.: 15/797,176

(22) Filed: Oct. 30, 2017

(65) Prior Publication Data

US 2018/0145512 A1    May 24, 2018

(30) Foreign Application Priority Data

Nov. 18, 2016    (JP) .................. 2016-225442

(51) Int. Cl.

| | |
|---|---|
| *H02J 4/00* | (2006.01) |
| *G05B 15/02* | (2006.01) |
| *G06Q 30/02* | (2012.01) |
| *G06Q 50/06* | (2012.01) |

(Continued)

(52) U.S. Cl.
CPC .............. *H02J 4/00* (2013.01); *G05B 15/02* (2013.01); *G06Q 30/0283* (2013.01);
(Continued)

(58) Field of Classification Search
CPC .......... H02J 4/00; H02J 3/14; H02J 2003/007; H02J 2003/146; G05B 15/02; G06Q 30/0283; G06Q 50/06
(Continued)

(56) References Cited

U.S. PATENT DOCUMENTS

| | | | |
|---|---|---|---|
| 2005/0003794 A1* | 1/2005 | Liu | H04W 52/0216 455/355 |
| 2009/0231152 A1* | 9/2009 | Tung | G06F 1/206 340/660 |

(Continued)

FOREIGN PATENT DOCUMENTS

| | | | | |
|---|---|---|---|---|
| JP | 2015-186397 | | 10/2015 | |
| JP | 2016-045570 A | * | 4/2016 | ............. G06Q 50/06 |

OTHER PUBLICATIONS

"Guidelines on negative negotiations", Natural Resources and Energy Agency, Mar. 30, 2015, pp. 1-21 (Partial Translation).

*Primary Examiner* — Brian W Wathen
*Assistant Examiner* — Alicia M. Choi
(74) *Attorney, Agent, or Firm* — Greenblum & Bernstein, P.L.C.

(57) ABSTRACT

A method includes (a) transmitting a power-saving request; (b) calculating a baseline; and (c) calculating a payment based on a difference between an actual amount of electric power consumed by an electric power load and the baseline, wherein in (b), a first baseline for a first power-saving period during which power is saved in accordance with a first power-saving request transmitted at an immediately preceding timing is calculated based on an average of amounts of electric power consumed during periods in the same time zone as the first power-saving period on previous days, and a second baseline for a second power-saving period during which power is saved in accordance with a second power-saving request transmitted at a different timing is calculated based on an average of amounts of electric power consumed during periods in the same time zone as the second power-saving period on previous days.

7 Claims, 8 Drawing Sheets

(51) Int. Cl.
*H02J 3/14* (2006.01)
*H02J 3/00* (2006.01)

(52) U.S. Cl.
CPC ............... *G06Q 50/06* (2013.01); *H02J 3/14* (2013.01); *H02J 2003/007* (2013.01); *H02J 2003/146* (2013.01); *Y02B 70/3225* (2013.01); *Y04S 20/222* (2013.01); *Y04S 20/224* (2013.01); *Y04S 50/14* (2013.01)

(58) Field of Classification Search
USPC ........................................................ 700/296
See application file for complete search history.

(56) References Cited

U.S. PATENT DOCUMENTS

| | | | | |
|---|---|---|---|---|
| 2009/0243517 | A1* | 10/2009 | Verfuerth | H05B 37/0272 |
| | | | | 315/315 |
| 2013/0134962 | A1* | 5/2013 | Kamel | G01R 21/1333 |
| | | | | 324/103 R |
| 2013/0218624 | A1* | 8/2013 | Ikeda | G06Q 10/06312 |
| | | | | 705/7.22 |
| 2013/0253890 | A1* | 9/2013 | Imahara | G06Q 50/06 |
| | | | | 703/6 |
| 2013/0311803 | A1* | 11/2013 | Wang | G06F 1/3212 |
| | | | | 713/320 |
| 2013/0345888 | A1* | 12/2013 | Forbes, Jr. | H02J 3/14 |
| | | | | 700/291 |
| 2015/0253795 | A1* | 9/2015 | Saito | G06Q 50/06 |
| | | | | 700/291 |
| 2017/0206614 | A1* | 7/2017 | Hwang | G06Q 50/06 |
| 2018/0275176 | A1* | 9/2018 | Takashima | G06F 19/00 |

* cited by examiner

POWER-SAVING CONTROL METHOD AND POWER-SAVING CONTROL SYSTEM

BACKGROUND

1. Technical Field

The present disclosure relates to a method and the like for controlling power saving.

2. Description of the Related Art

Japanese Unexamined Patent Application Publication No. 2015-186397 discloses a demand response system that gives a notification of an event for requesting suppression of an electric power demand and calculates an incentive based on a difference between a baseline and an actual measurement value of an amount of used electric power.

However, there is a possibility that an amount of consumed electric power change irrespective of power saving conducted in response to a power-saving request. It is therefore not easy to properly evaluate an amount of saved electric power.

SUMMARY

One non-limiting and exemplary embodiment provides a method and the like that can properly evaluate an amount of saved electric power.

In one general aspect, the techniques disclosed here feature a method includes: (a) transmitting, to a consumer, a power-saving request requesting the consumer to start power saving at a plurality of timings; (b) calculating a baseline of an amount of electric power consumed by an electric power load during a power-saving period during which the consumer saves electric power of the electric power load in accordance with the power-saving request; and (c) calculating a payment for the consumer based on a difference between an actual amount of electric power consumed by the electric power load of the consumer during the power-saving period and the baseline, wherein in the (b) calculating, a first baseline for a first power-saving period during which the consumer saves electric power of the electric power load in accordance with a first power-saving request transmitted at a timing that immediately precedes a scheduled time of start of power saving among the plurality of timings is calculated based on an average of amounts of electric power consumed by the electric power load during a plurality of periods in a same time zone as the first power-saving period on a plurality of previous days, and wherein in the (b) calculating, a second baseline for a second power-saving period during which the consumer saves electric power of the electric power load in accordance with a second power-saving request transmitted at a timing different from the timing that immediately precedes the scheduled time of the start of power saving among the plurality of timings is calculated based on an average of amounts of electric power consumed by the electric power load during a plurality of periods in a same time zone as the second power-saving period on a plurality of previous days.

According to the method and the like, it is possible to properly evaluate an amount of saved electric power.

It should be noted that general or specific embodiments may be implemented as a system, an apparatus, a method, an integrated circuit, a computer program, a computer-readable non-transitory recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

The inventor of the present disclosure found problems concerning power-saving conducted in response to a power-saving request. The problems are specifically described below.

Figure 1:
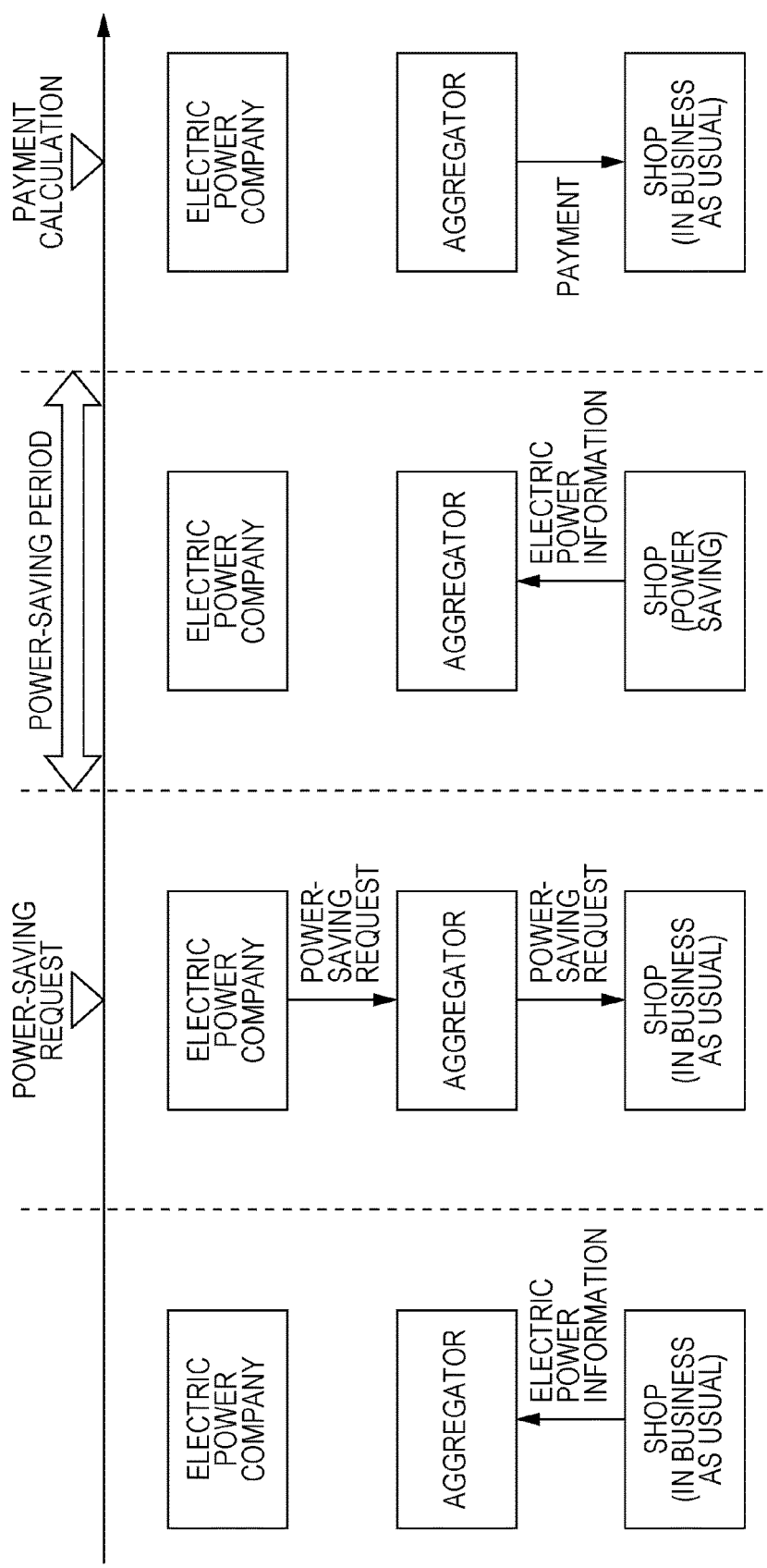
FIG. 1 is a transition diagram illustrating flow of power saving in a reference example.

FIG. 1 is a transition diagram illustrating flow of power-saving in a reference example. FIG. 1 illustrates an electric power company, an aggregator, and a shop. The electric power company is a company that sells electric power, and, for example, generates, transmits, and distributes electric power. The aggregator is an intermediary business operator between the electric power company and a consumer and manages electric power. For example, during a tight supply-demand situation for electric power, the aggregator prompts the consumer to save electric power and supplies "negawatt" power to the electric power company. The shop is an example of a consumer and sells goods. For example, the shop is a convenience store or a supermarket.

For example, the shop periodically transmits electric power information indicative of an amount of consumed electric power to the aggregator. The aggregator periodically receives the electric power information from the shop.

The electric power company transmits a power-saving request for a power-saving period to the aggregator before the start of the power-saving period. That is, a power-saving request for a power-saving period is issued. The power-saving period is a period during which occurrence of a tight supply-demand situation for electric power is predicted. The aggregator receives the power-saving request from the electric power company and then transmits the power-saving request to the shop. The shop receives the power-saving request from the aggregator.

The shop saves electric power during the power-saving period based on the power-saving request. Also during the power-saving period, the shop periodically transmits the electric power information to the aggregator, and the aggregator periodically receives the electric power information from the shop.

After the power-saving period, the aggregator calculates a payment based on an amount of electric power saved in the shop. In this process, the aggregator calculates a payment based on a difference between an amount of consumed electric power indicated by electric power information received before the power-saving request and an amount of consumed electric power indicated by electric power information received during the power-saving period. More specifically, the aggregator calculates a baseline based on an amount of electric power consumed before the power-saving request and calculates a payment based on a difference between the baseline and an amount of electric power consumed during the power-saving period. Then, the aggregator gives the calculated payment to the shop.

It is assumed that a difference between an amount of consumed electric power before the start of the power-saving period and an amount of consumed electric power during the power-saving period is an amount of consumed electric power reduced by power saving and corresponds to an amount of saved electric power. However, it is inappropriate to unjustly increase an amount of saved electric power and increase a calculated payment by increasing an amount of consumed electric power during a period from issuance of the power-saving request to the start of the power-saving period and then returning the amount of consumed electric power to the original amount during the power-saving period. In view of this, the aggregator calculates a payment based on a difference between an amount of consumed electric power before issuance of the power-saving request and an amount of consumed electric power during the power-saving period.

Figure 2:
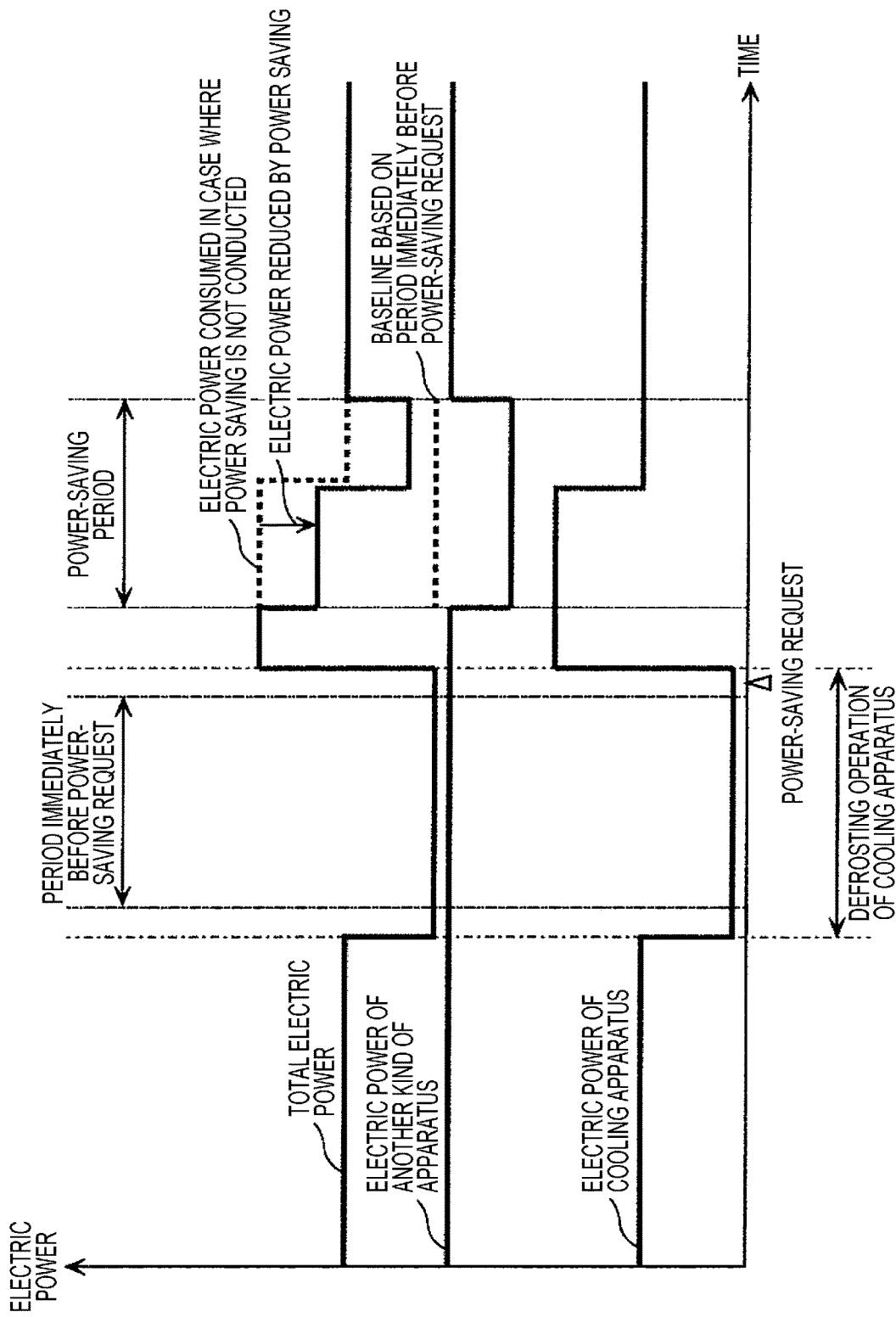
FIG. 2 is a graph illustrating a change of electric power in the reference example.

FIG. 2 is a graph illustrating a change of electric power in the reference example. FIG. 2 illustrates electric power of a cooling apparatus, electric power of another apparatus, and total electric power of the cooling apparatus and the other apparatus. The cooling apparatus is an apparatus for freezing or cooling and may be, for example, a showcase for freezing or cooling, a freezing machine, or a refrigerator. In particular, the cooling apparatus regularly or irregularly performs a defrosting operation. The other apparatus is an electric apparatus different from the cooling apparatus and is, for example, an air conditioner. In a case where the shop has a plurality of electric apparatuses that are different from the cooling apparatus, the other apparatus need just be at least one of the plurality of electric apparatuses.

In this example, the power-saving request is issued at a timing immediately before the power-saving period, and a baseline is calculated based on an amount of consumed electric power during a period immediately before the power-saving request. That is, the period immediately before the power-saving request is a period for calculation of the baseline, and a value equivalent to total electric power during the period immediately before the power-saving request is calculated as the baseline.

The timing immediately before the power-saving period is a timing that immediately precedes the power-saving period and is, for example, a timing between one hour before the power-saving period and the start of the power-saving period. The period immediately before the power-saving request is, for example, a period that ends at a timing between one hour before the power-saving request and the power-saving request. The length of the period immediately before the power-saving request is, for example, 10 minutes to 6 hours. The length of the period immediately before the power-saving request may be defined based on the length of the power-saving period.

In this example, the period immediately before the power-saving request is included in a period of a defrosting operation of the cooling apparatus. That is, the period for calculation of the baseline is included in the period of the defrosting operation of the cooling apparatus. In the defrosting operation, the cooling apparatus stops a cooling operation in order to melt frost. Accordingly, during the defrosting operation, electric power consumed by the cooling apparatus is small, and total electric power consumed by the cooling apparatus and the other apparatus is also small.

In this example, the defrosting operation of the cooling apparatus terminates between the issuance of the power-saving request and the start of the power-saving period. Then, the cooling apparatus temporarily consumes larger electric power than usual in order to recover the temperature that has risen due to stop of the cooling operation back to a low temperature. Accordingly, total electric power consumed by the cooling apparatus and the other apparatus temporarily becomes large.

In this example, since the period for calculation of the baseline is included in the period of the defrosting operation of the cooling apparatus, the baseline is calculated to be low. Furthermore, since the power-saving period and a period during which electric power consumed by the cooling apparatus temporarily becomes larger partially overlaps, total electric power during the power-saving period is basically large.

It is therefore difficult to make total electric power during the power-saving period smaller than the baseline calculated based on the total electric power during the period immediately before the power-saving request even if electric power consumed by the other apparatus is reduced by power saving. Although a too low baseline is calculated in this example, there is a possibility that a too high baseline be calculated due to a large fluctuation in electric power. As a result, there is a possibility that an amount of saved power corresponding to electric power reduced by power saving is not properly evaluated, and power saving is not properly conducted.

The above example is an example concerning a cooling apparatus, but a similar problem can occur as for other kinds of electric power load having a plurality of operation modes that are markedly different from one another in amount of consumed electric power. In particular, the above problem is more remarkable in a case where an operation mode that is relatively small in terms of amount of consumed electric power among a plurality of operation modes is not an operation mode for power saving but one of general operation modes such as the defrosting operation of the cooling apparatus because it is difficult to distinguish such an operation mode from an operation mode for power saving.

In view of this, a method according to as aspect of the present disclosure includes: (a) transmitting, to a consumer, a power-saving request requesting the consumer to start power saving at a plurality of timings; (b) calculating a baseline of an amount of electric power consumed by an electric power load during a power-saving period during which the consumer saves electric power of the electric power load in accordance with the power-saving request; and (c) calculating a payment for the consumer based on a difference between an actual amount of electric power consumed by the electric power load of the consumer during the power-saving period and the baseline, wherein in the (b) calculating, a first baseline for a first power-saving period during which the consumer saves electric power of the electric power load in accordance with a first power-saving request transmitted at a timing that immediately precedes a scheduled time of start of power saving among the plurality of timings is calculated based on an average of amounts of electric power consumed by the electric power load during a plurality of periods in a same time zone as the first power-saving period on a plurality of previous days, and wherein in the (b) calculating, a second baseline for a second power-saving period during which the consumer saves electric power of the electric power load in accordance with a second power-saving request transmitted at a timing different from the timing that immediately precedes the scheduled time of the start of power saving among the plurality of timings is calculated based on an average of amounts of electric power consumed by the electric power load during a plurality of periods in a same time zone as the second power-saving period on a plurality of previous days.

With this arrangement, a baseline is calculated based on an average on a plurality of previous days irrespective of whether a power-saving request is made at an immediately preceding timing or made at a different timing. In particular, a baseline is calculated based on not a period immediately before a power-saving request but an average on a plurality of previous days even in a case where the power-saving request is made at an immediately preceding timing. This makes it possible to prevent the baseline from becoming too low or too high even in an environment where a fluctuation of electric power is large. It is therefore possible to properly evaluate an amount of saved electric power.

The method may be, for example, arranged such that in the (b) calculating, the first baseline is calculated based on an average of amounts of electric power consumed by a first electric power load including a cooling apparatus and a second electric power load different from the first electric power load during a plurality of periods in a same time zone as the first power-saving period on a plurality of previous days; and in the (b) calculating, the second baseline is calculated based on an average of amounts of electric power consumed by the first electric power load and the second electric power load during a plurality of periods in a same time zone as the second power-saving period on a plurality of previous days.

With the arrangement, an amount of electric power consumed by a first electric power load including a cooling apparatus and an amount of electric power consumed by a second electric power load are not distinguished. It is therefore possible to simply calculate a baseline.

The method may be, for example, arranged such that in the (b) calculating, the first baseline is calculated based on an average of amounts of electric power consumed by a first electric power load including a cooling apparatus during a plurality of periods in a same time zone as the first power-saving period on a plurality of previous days and an amount of electric power consumed by a second electric power load different from the first electric power load on a same day as the first power-saving period and before the first power-saving period; and in the (b) calculating, the second baseline is calculated based on an average of amounts of electric power consumed by the first electric power load and the second electric power load during a plurality of periods in a same time zone as the second power-saving period on a plurality of previous days.

With the arrangement, an average of amounts of consumed electric power on a plurality of previous days is used for calculation of a baseline as for a first electric power load including a cooling apparatus that is large in fluctuation of an amount of consumed electric power. An amount of consumed electric power on the same day as a power-saving period is used for calculation of a baseline as for a second electric power load that is small in fluctuation of an amount of consumed electric power.

The method may be, for example, arranged such that the second electric power load includes an air conditioner.

This makes it possible to properly calculate a baseline in an environment including a cooling apparatus and an air conditioner.

A system according to an aspect of the present disclosure includes a transmitter that transmits, to a consumer, a power-saving request requesting the consumer to start power saving at a plurality of timings; a first calculator that calculates a baseline of an amount of electric power consumed by an electric power load during a power-saving period during which the consumer saves electric power of the electric power load in accordance with the power-saving request; and a second calculator that calculates a payment for the consumer based on a difference between an actual amount of electric power consumed by the electric power load of the consumer during the power-saving period and the baseline, wherein the first calculator calculates a first baseline for a first power-saving period during which the consumer saves electric power of the electric power load in accordance with a first power-saving request transmitted at a timing that immediately precedes a scheduled time of start of power saving among the plurality of timings based on an average of amounts of electric power consumed by the electric power load during a plurality of periods in a same time zone as the first power-saving period on a plurality of previous days, and wherein the first calculator calculates a second baseline for a second power-saving period during which the consumer saves electric power of the electric power load in accordance with a second power-saving request transmitted at a timing different from the timing that immediately precedes the scheduled time of the start of power saving among the plurality of timings based on an average of amounts of electric power consumed by the electric power load during a plurality of periods in a same time zone as the second power-saving period on a plurality of previous days.

With this configuration, the system can calculate a baseline based on an average on a plurality of previous days irrespective of whether a power-saving request is made at an immediately preceding timing or made at a different timing.

In particular, a baseline is calculated based on not a period immediately before a power-saving request but an average on a plurality of previous days even in a case where the power-saving request is made at an immediately preceding timing. This makes it possible to prevent the baseline from becoming too low or too high even in an environment where a fluctuation of electric power is large. Therefore, the system can properly evaluate an amount of saved electric power.

A non-transitory computer-readable recording medium according to an aspect of the present disclosure is a non-transitory computer-readable recording medium storing a program for causing a computer to execute the method.

That is, a method for properly evaluating an amount of saved electric power is realized as a non-transitory computer-readable recording medium storing a program.

It should be noted that general or specific embodiments may be implemented as a system, an apparatus, a method, an integrated circuit, a computer program, a computer-readable recording medium such as a CD-ROM, or any selective combination thereof.

Embodiments are specifically described below with reference to the drawings. Each of the embodiments described below is a general or specific example of the present disclosure. Numerical values, shapes, materials, constituent elements, the way in which the constituent elements are disposed and connected, steps, the order of steps, and the like in the embodiments below are examples and do not limit the present disclosure. Among constituent elements in the embodiments below, constituent elements that are not described in independent claims indicating highest concepts are described as optional constituent elements.

Ordinal numbers such as "first" and "second" may be added to constituent elements, and the ordinal numbers of the constituent elements may be replaced or may be removed. An amount of consumed electric power may correspond to a total amount of electric power during a predetermined period or may correspond to electric power that is an amount of electric power per unit time. In some cases, "electric power" and "an amount of electric power" may refer to a value of the electric power and a value of the amount of electric power, respectively.

The term "shop" is used to refer to a place where goods are sold, a building where goods are sold, a business operator who sells goods, and the like. The shop is also an example of a consumer to whom electric power is supplied. The term "shop" sometimes refers to a staff member or an owner of the shop.

Embodiment 1

Figure 3:
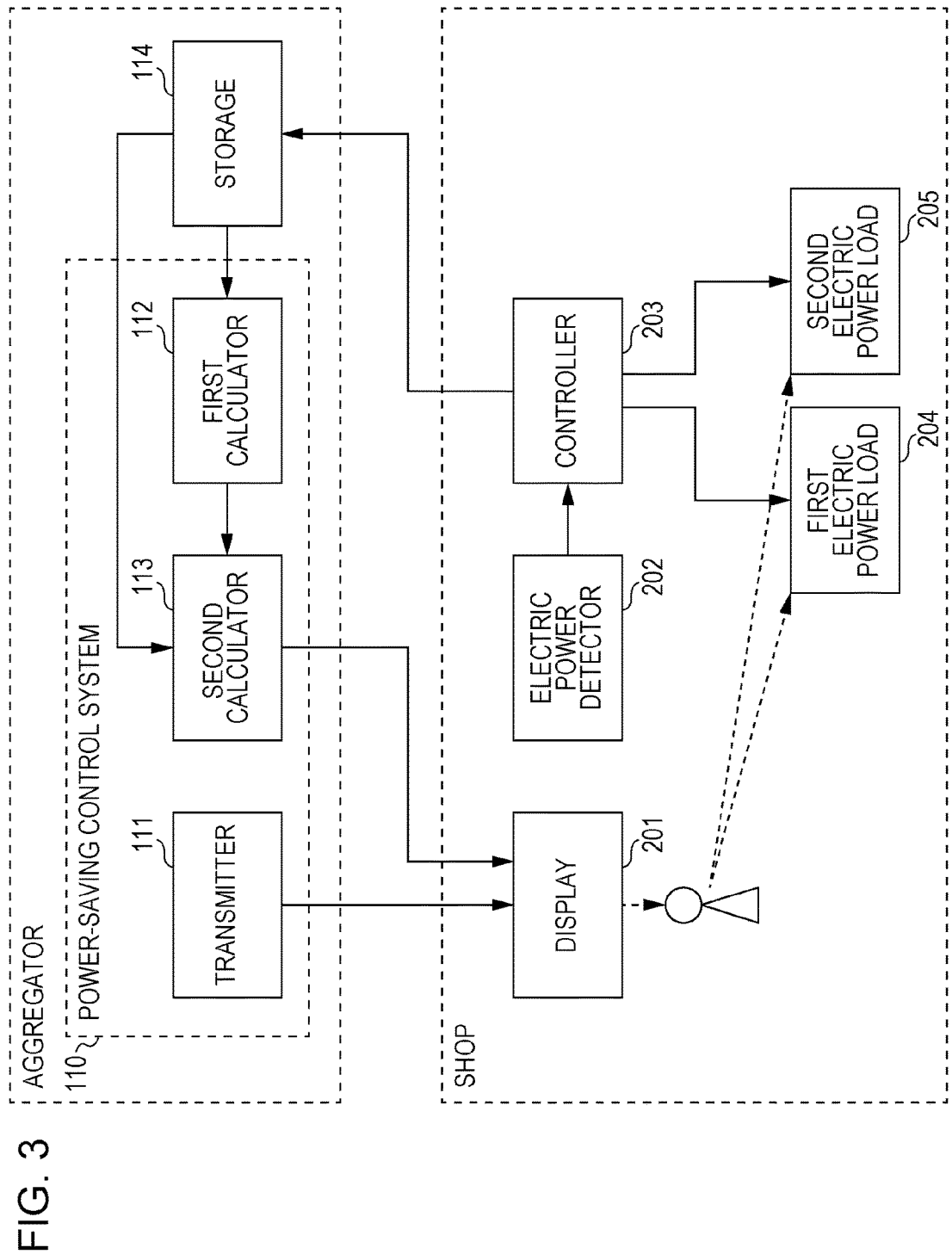
FIG. 3 is a block diagram illustrating an environment including a system according to Embodiment 1.

FIG. 3 is a block diagram illustrating an environment including a power-saving control system according to the present embodiment. For example, a transmitter 111, a first calculator 112, a second calculator 113, and a storage 114 are used and managed by an aggregator. The transmitter 111, the first calculator 112, and the second calculator 113 constitute a power-saving control system 110. A display 201, an electric power detector 202, a controller 203, a first electric power load 204, and a second electric power load 205 are placed at a shop.

The transmitter 111 is an example of a transmitter according to the present disclosure and is a communication unit that transmits, to a consumer, a power-saving request requesting the consumer to save electric power during a power-saving period. That is, the transmitter 111 issues the power-saving request. The transmitter 111 can also be expressed as a power-saving request issuing unit.

Specifically, the transmitter 111 may include a terminal for wired communication or an antenna for wireless communication. The transmitter 111 may include an arithmetic processing unit for controlling communication, a storage, and the like. The arithmetic processing unit may be a microprocessor unit (MPU) or a central processing unit (CPU). The storage may be a volatile memory or may be a non-volatile memory. A communication control program may be stored in the storage.

For example, the transmitter 111 transmits a power-saving request to the display 201 of the shop by wired or wireless communication. This causes the power-saving request to be displayed on the display 201, thereby prompting a staff member or the like of the shop to save electric power. The transmitter 111 may transmit the power-saving request upon receipt of an instruction from the aggregator, may transmit the power-saving request upon receipt of the power-saving request from an electric power company, or may transmit the power-saving request in a case where shortage of electric power is predicted.

The transmitter 111 transmits, at a plurality of timings, a plurality of power-saving requests for requesting the consumer to save electric power during a plurality of power-saving periods. Each of the plurality of timings is a timing specified relative to a power-saving period.

For example, the transmitter 111 transmits, at a first timing, a first power-saving request requesting the consumer to save electric power during a first power-saving period and transmits, at a second timing, a second power-saving request requesting the consumer to save electric power during a second power-saving period. The first timing is a timing that immediately precedes the first power-saving period, and the second timing is a timing different from a timing that immediately precedes the second power-saving period.

The timing that immediately precedes the first power-saving period is, for example, a timing between one hour before the first power-saving period and the start of the first power-saving period. The timing different from the timing that immediately precedes the second power-saving period is, for example, a timing before one hour before the second power-saving period.

The first calculator 112 is an example of a first calculator according to the present disclosure and is a calculator that calculates a baseline. The first calculator 112 can also be expressed as a baseline calculating unit. The first calculator 112 may include an arithmetic processing unit for calculation processing, a storage, and the like. The arithmetic processing unit may be a microprocessor unit (MPU) or a central processing unit (CPU). The storage may be a volatile memory or may be a non-volatile memory. A calculation processing program may be stored in the storage.

The baseline is a reference amount of consumed electric power that is used to evaluate an amount of electric power saved during the power-saving period. The amount of saved electric power can also be expressed as a power-saving effect. The amount of saved electric power is larger as a value obtained by subtracting an actual amount of consumed electric power from the baseline is larger. The first calculator 112 calculates a plurality of baselines for the plurality of power-saving periods, respectively. For example, the first calculator 112 calculates a first baseline for the first power-saving period corresponding to the first power-saving request and calculates a second baseline for the second power-saving period corresponding to the second power-saving request.

Furthermore, the first calculator 112 may transmit baseline information indicative of a baseline to the display 201 of the shop in order to notify a staff member or the like of the shop about the baseline calculated for a power-saving period. For example, the first calculator 112 may prompt the staff member or the like of the shop to save electric power in order to make an amount of consumed electric power lower than a baseline by calculating the baseline and transmitting baseline information to the display 201 of the shop before the power-saving period.

The second calculator 113 is an example of a second calculator according to the present disclosure and is a calculator that calculates a payment. The second calculator 113 can also be expressed as a power-saving fee calculating unit. The second calculator 113 may include an arithmetic processing unit for calculation processing, a storage, and the like. The arithmetic processing unit may be a microprocessor unit (MPU) or a central processing unit (CPU). The storage may be a volatile memory or may be a non-volatile memory. A calculation processing program may be stored in the storage.

The payment can be expressed as a power-saving fee. The payment corresponds to an amount of saved electric power. Specifically, the payment becomes higher as the amount of saved electric power becomes larger. That is, proper calculation of the payment corresponds to proper evaluation of the amount of saved electric power.

For example, the second calculator 113 calculates a payment based on a difference between a baseline calculated by the first calculator 112 and an actual amount of electric power consumed during a power-saving period. The second calculator 113 may transmit payment information indicative of the calculated payment to the display 201 of the shop in order to notify the staff member or the like about the calculated payment.

The storage 114 is a storage in which information is stored. The storage 114 may include, for example, a volatile memory or a non-volatile memory in which electric power information is stored and can also be expressed as an electric power information accumulation unit. For example, electric power information indicative of an amount of electric power consumed by a first electric power load 204 and a second electric power load 205 is stored and accumulated in the storage 114. The electric power information may be a total amount of electric power consumed by electric power loads including the first electric power load 204 and the second electric power load 205.

Specifically, an amount of electric power consumed by the first electric power load 204 and the second electric power load 205 are detected by the electric power detector 202. Then, electric power information indicative of the amount of electric power consumed by the first electric power load 204 and the second electric power load 205 is transmitted by the controller 203 and is then stored in the storage 114. Then, the electric power information stored in the storage 114 is used for calculation of a baseline in the first calculator 112 and calculation of a payment in the second calculator 113.

The display 201 is an output unit that displays information. For example, the display 201 displays power-saving information concerning power saving and can also be expressed as a power-saving information display unit. The display 201 may include a cathode-ray tube display, a liquid crystal display, a projector, or the like for displaying information. The display 201 may include an arithmetic processing unit for controlling display, a storage, and the like. The arithmetic processing unit may be a microprocessor unit (MPU) or a central processing unit (CPU). The storage may be a volatile memory or may be a non-volatile memory. A display control program may be stored in the storage.

For example, the display 201 receives and displays a power-saving request transmitted from the transmitter 111 before the start of a power-saving period. The staff member or the like of the shop saves electric power during the power-saving period based on the power-saving request displayed on display 201. The display 201 may receive and display payment information received from the second calculator 113 after the end of the power-saving period. Furthermore, the display 201 may receive and display baseline information transmitted from the first calculator 112.

The electric power detector 202 is a detector that detects an amount of consumed electric power and is, for example, an electric power meter placed at the shop. The electric power detector 202 may be a smart meter that includes a communication unit that transmits electric power information indicative of a detected amount of consumed electric power. For example, the electric power detector 202 detects an amount of electric power consumed by the first electric power load 204 and the second electric power load 205 at constant time intervals and transmits electric power information indicative of the detected amount of consumed electric power to the controller 203.

The controller 203 is a controller that controls an amount of consumed electric power and the like. The controller 203 may include an arithmetic processing unit, a storage, and the like. The arithmetic processing unit may be a microprocessor unit (MPU) or a central processing unit (CPU). The storage may be a volatile memory or may be a non-volatile memory. A control program may be stored in the storage. The controller 203 may be a single controller that performs centralized control or may be made up of a plurality of controllers that perform distributed control in cooperation with one another.

For example, the controller 203 receives electric power information indicative of an amount of consumed electric power detected by the electric power detector 202 and transmits the electric power information to the aggregator at constant time intervals. In this way, the controller 203 causes electric power information indicative of an amount of consumed electric power detected by the electric power detector 202 to be stored and accumulated in the storage 114 of the aggregator at constant time intervals. Furthermore, the controller 203 may control an amount of electric power consumed by the first electric power load 204 and the second electric power load 205 by controlling operations of the first electric power load 204 and the second electric power load 205.

The first electric power load 204 is an example of a first electric power load according to the present disclosure and is an electric power load including a cooling apparatus. More specifically, the first electric power load 204 includes one or more cooling apparatuses and does not include another kind of apparatus that is different from the cooling apparatuses.

The cooling apparatuses are apparatuses for freezing or cooling and may be a showcase for freezing or cooling, a freezing machine, a refrigerator, or the like. In particular, the cooling apparatuses regularly or irregularly performs a defrosting operation. For example, the first electric power load 204 includes a showcase for freezing or cooling, a freezing machine, a refrigerator, and the like.

The second electric power load 205 is an example of a second electric power load according to the present disclosure and is an electric power load different from the first electric power load 204. That is, the second electric power load 205 is an electric power load that does not include a cooling apparatus and is an electric power load that includes another kind of apparatus different from the cooling apparatus. More specifically, the second electric power load 205 includes one or more other apparatuses different from the cooling apparatus and does not include a cooling apparatus.

For example, the second electric power load 205 includes an air-conditioner. The second electric power load 205 may further include a lighting device, a copy machine, an automated teller machine, a point of sale (POS) register, a warmer, a cooking device, a microwave, and the like.

Figure 4:
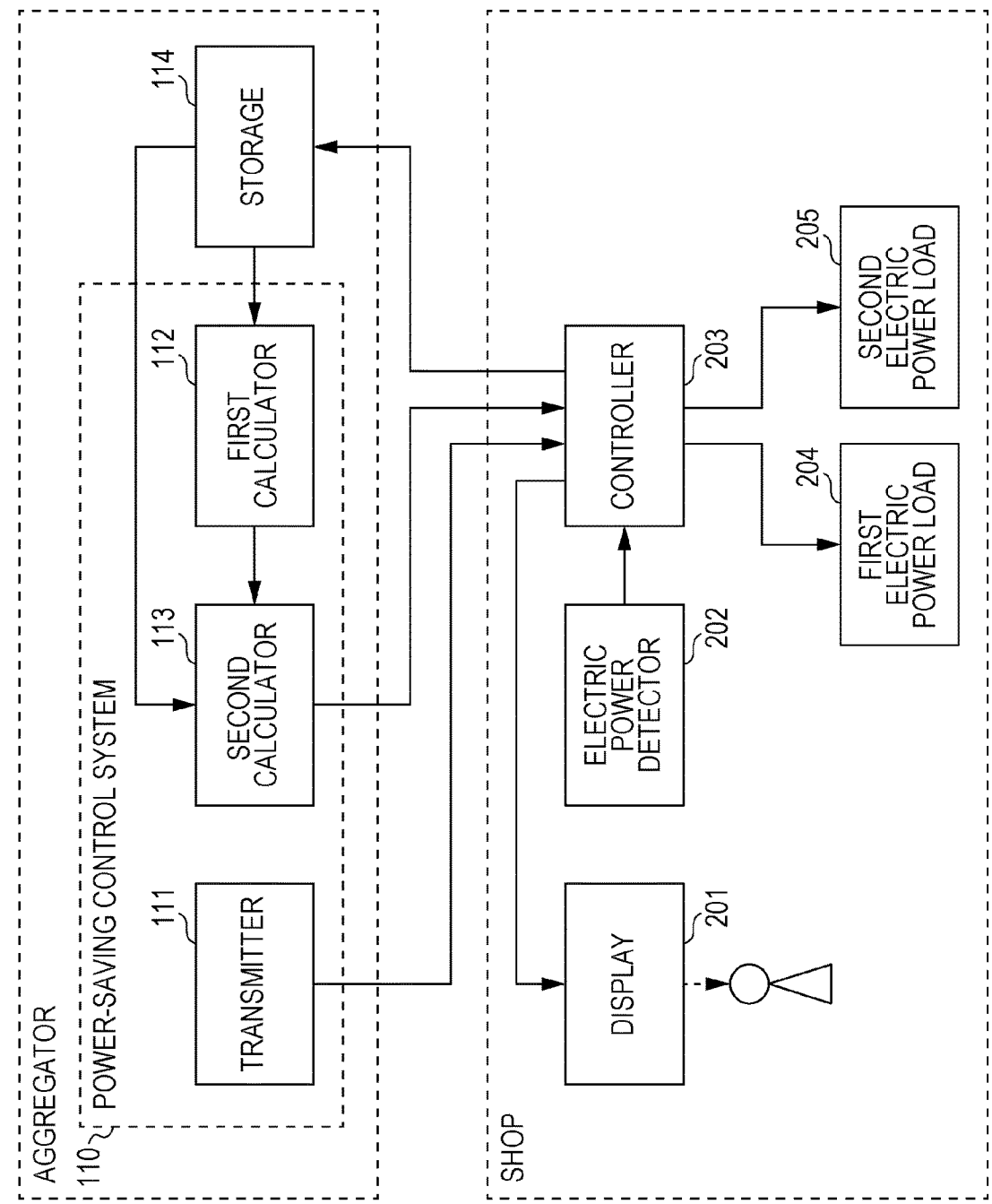
FIG. 4 is a block diagram illustrating a modification of the environment including the system according to Embodiment 1.

FIG. 4 is a block diagram illustrating a modification of the environment illustrated in FIG. 3. In this example, the transmitter 111 transmits a power-saving request to the controller 203 of the shop. The controller 203 receives the power-saving request from the transmitter 111 and reduces an amount of electric power consumed by the first electric power load 204 and the second electric power load 205 by controlling operations of the first electric power load 204 and the second electric power load 205 based on the power-saving request.

The controller 203 may stop operation of one or more apparatuses or may cause one or more apparatuses to operate in a power-saving mode among the first electric power load 204 and the second electric power load 205 in order to reduce an amount of electric power consumed during a power-saving period corresponding to the power-saving request. For example, the controller 203 transmits, to one or more apparatuses, a control command to reduce an amount of consumed electric power during the power-saving period. Each of the one or more apparatuses receives the control command and changes an operation thereof in accordance with the control command. In this way, the amount of consumed electric power is reduced.

The controller 203 may transmit a power-saving request to the display 201. The display 201 may receive and display the power-saving request transmitted from the controller 203. In this way, a staff member or the like of the shop is notified of the power-saving request. That is, a notification indicating that power-saving control is performed based on the power-saving request is given to the staff member or the like of the shop.

In this example, the second calculator 113 calculates a payment and transmits payment information indicative of the calculated payment to the controller 203 of the shop. The controller 203 receives the payment information from the second calculator 113 and transmits the payment information to the display 201. The display 201 receives and displays the payment information transmitted from the controller 203. In this way, the staff member or the like of the shop is notified of the payment.

The first calculator 112 may calculate a baseline and transmit baseline information indicative of the calculated baseline to the controller 203 of the shop. Then, the controller 203 may receive the baseline information from the first calculator 112 and transmits the baseline information to the display 201. Then, the display 201 may receive and display the baseline information transmitted from the controller 203. In this way, the staff member or the like of the shop is notified of the baseline.

In this modification, electric power is automatically saved based on the power-saving request even if the staff member or the like of the shop does not manually save electric power. This enables smooth power saving. Furthermore, the controller 203 can collectively manage various kinds of information. This puts communication under control, thereby making a communication environment less complicated.

Figure 5:
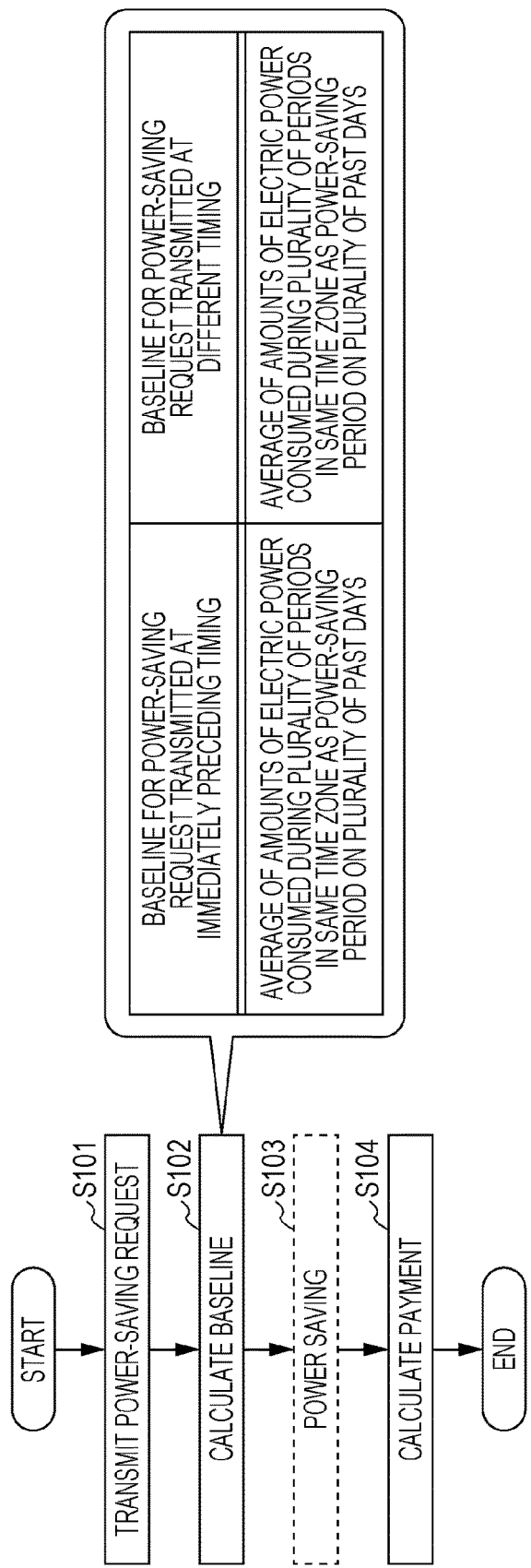
FIG. 5 is a flowchart illustrating an operation of the system according to Embodiment 1.

FIG. 5 is a flowchart illustrating an operation of the power-saving control system 110 in the environment illustrated in FIG. 3 or 4.

First, the transmitter 111 transmits a power-saving request requesting the consumer to start power saving (S101). The transmitter 111 transmits a plurality of power-saving requests to the consumer at a plurality of timings. For example, the transmitter 111 transmits a first power-saving request for a first power-saving period at a timing that immediately precedes a scheduled time of the start of power saving. Furthermore, the transmitter 111 transmits a second power-saving request for a second power-saving period at a timing different from a timing that immediately precedes a scheduled time of the start of power saving.

Next, the first calculator 112 calculates a baseline of an amount of electric power consumed by an electric power load during a power-saving period (S102). In this step, the first calculator 112 calculates the baseline based on an average of amounts of electric power consumed by an electric power load during a plurality of periods in the same time zone as the power-saving period on a plurality of previous days irrespective of whether the power-saving request is transmitted at the immediately preceding timing or the different timing.

The power-saving period is a period during which electric power of the electric power load is saved by the consumer in accordance with the power-saving request. The amount of electric power consumed by the electric power load is an amount of electric power consumed by the first electric power load 204 and the second electric power load 205. The time zone corresponds to a time zone in one day and corresponds to a part of a period except for a date.

For example, the first calculator 112 calculates a baseline for a power-saving request transmitted at the immediately preceding timing based on an average of amounts of electric power consumed by the electric power load during a plurality of periods in the same time zone as the power-saving period on a plurality of previous days.

In other words, the first calculator 112 calculates a first baseline for the first power-saving period during which electric power of the electric power load is saved in accordance with the first power-saving request based on an average of amounts of electric power consumed by the electric power load during a plurality of periods in the same time zone as the first power-saving period on a plurality of previous days. The first power-saving request is a power-saving request transmitted at a timing that immediately precedes a scheduled time of the start of power saving.

The first calculator 112 may calculate a baseline for a power-saving request transmitted at an immediately preceding timing so that the baseline matches an average of amounts of electric power consumed by the electric power load during a plurality of periods in the same time zone as the power-saving period on a plurality of previous days. In other words, the first calculator 112 may calculate the first baseline for the first power-saving period during which electric power of the electric power load is saved in accordance with the first power-saving request so that the first baseline matches an average of amounts of electric power consumed by the electric power load during a plurality of periods in the same time zone as the first power-saving period on a plurality of previous days.

Furthermore, for example, the first calculator 112 calculates a baseline for a power-saving request transmitted at a timing different from an immediately preceding timing based on an average of amounts of electric power consumed by the electric power load during a plurality of periods in the same time zone as the power-saving period on a plurality of previous days.

In other words, the first calculator 112 calculates a second baseline for the second power-saving period during which electric power of the electric power load is saved in accordance with the second power-saving request based on an average of amounts of electric power consumed by the electric power load during a plurality of periods in the same time zone as the second power-saving period on a plurality of previous days. The second power-saving request is a power-saving request transmitted at a timing different from an immediately preceding timing.

The first calculator 112 may calculate a baseline for a power-saving request transmitted at a timing different from an immediately preceding timing so that the baseline matches an average of amounts of electric power consumed by the electric power load during a plurality of periods in the same time zone as the power-saving period on a plurality of previous days. In other words, the first calculator 112 may calculate the second baseline for the second power-saving period during which electric power of the electric power load is saved in accordance with the second power-saving request so that the second baseline matches an average of amounts of electric power consumed by the electric power load during a plurality of periods in the same time zone as the second power-saving period on a plurality of previous days.

Next, the consumer saves electric power of the electric power load in accordance with the power-saving request (S103). For example, the consumer saves electric power, for example, by stopping operation of one or more apparatuses included in the electric power load or causing one or more apparatuses included in the electric power load to operate in a power-saving mode. This power-saving processing itself need not necessarily be performed by the power-saving control system 110. Furthermore, the consumer may decide not to save electric power.

Calculation of the baseline (S102) may be performed by the first calculator 112 not before power saving (S103) but after power saving (S103).

Next, the second calculator 113 calculates a payment for the consumer based on a difference between an actual amount of electric power consumed by the electric power load of the consumer during the power-saving period and the baseline (S104). For example, a value obtained by subtracting the actual amount of consumed electric power from the baseline corresponds to an amount of saved electric power. The second calculator 113 calculates the payment to be higher as the amount of saved electric power becomes larger.

As described above, the power-saving control system 110 calculates a baseline based on an average of amounts of electric power consumed by the electric power load during a plurality of periods in the same time zone as the power-saving period on a plurality of previous days irrespective of whether the power-saving request is transmitted at an immediately preceding timing or a different timing. This is based on the following reason.

Basically, it is assumed that a difference between an amount of consumed electric power before the start of the power-saving period and an amount of consumed electric power during the power-saving period is an amount of consumed electric power reduced by power saving and corresponds to an amount of saved electric power. However, it is inappropriate to unjustly increase an amount of saved electric power and increase a calculated payment by increasing an amount of consumed electric power during a period from issuance of a power-saving request to the start of the power-saving period and then returning the amount of consumed electric power to the original amount during the power-saving period. In view of this, the power-saving control system 110 calculates the baseline based on the amount of consumed electric power before the power-saving request.

A period from issuance of a power-saving request transmitted at a timing different from a timing that immediately precedes a power-saving period to the start of the power-saving period is long. Therefore, there is a possibility that the amount of consumed electric power change between issuance of the power-saving request and the start of the power-saving period. In view of this, the power-saving control system 110 calculates a baseline for such a power-saving request based on an average of amounts of electric power consumed by an electric power load during a plurality of periods in the same time zone as the power-saving period on a plurality of previous days.

It is assumed that the average of amounts of electric power consumed by the electric power load during a plurality of periods in the same time zone as the power-saving period on a plurality of previous days is a normal amount of consumed electric power during the power-saving period. Therefore, even in a case where the period from issuance of a power-saving request to the start of the power-saving period is long, the power-saving control system 110 can properly evaluate an amount of saved electric power and properly calculate a payment by calculating a baseline based on an average of past amounts of consumed electric power.

Meanwhile, a period from issuance of a power-saving request transmitted at a timing that immediately precedes the power-saving period to the start of the power-saving period is short. Therefore, it is assumed that a difference between an amount of consumed electric power during a period immediately before the power-saving request transmitted at an immediately preceding timing and an amount of consumed electric power during the power-saving period corresponds to an amount of saved electric power. Basically, it may therefore be better to calculate a baseline for a power-saving request transmitted at an immediately preceding timing based on an amount of consumed electric power during the period immediately before the power-saving request that is closer in time to the power-saving period.

However, in an environment where a change in amount of consumed electric power is large as illustrated in FIG. 2, there is a possibility that a difference between an amount of consumed electric power during the period immediately before the power-saving request and an amount of consumed electric power during the power-saving period does not correspond to an amount of saved electric power. In view of this, the power-saving control system 110 calculates a baseline based on an average of amounts of electric power consumed by an electric power load during a plurality of periods in the same time zone as the power-saving period on a plurality of previous days even in a case where the period from issuance of the power-saving request to the start of the power-saving period is short.

Since the baseline is thus calculated based on an average of past amounts of consumed electric power, it is possible to prevent the baseline from becoming too large or too small. For example, it is possible to prevent the baseline from becoming too small because of a defrosting operation of a cooling apparatus. Furthermore, characteristics of an amount of consumed electric power based on a time zone are reflected in the baseline.

That is, the power-saving control system 110 calculates a baseline based on an average of amounts of electric power consumed by an electric power load during a plurality of periods in the same time zone as the power-saving period on a plurality of previous days irrespective of whether the power-saving request is transmitted as an immediately preceding timing or a different timing. This allows the power-saving control system 110 to properly evaluate an amount of saved electric power and properly calculate a payment.

In calculation of an average of amounts of consumed electric power, a day on which an amount of consumed electric power is small may be excluded. For example, the first calculator 112 may calculate a baseline based on an average of amounts of electric power consumed by an electric power load during four periods in the same time zone as the power-saving period on four days on which an amount of electric power consumed by the electric power load during a period in the same time zone as the power-saving period is large among past five days.

This is highly likely to exclude an excessively small amount of consumed electric power during a period of a defrosting operation of a cooling apparatus from information for calculation of the baseline. Therefore, the power-saving control system 110 can more properly prevent a baseline from becoming too small because of a defrosting operation of a cooling apparatus.

Embodiment 2

In the present embodiment, a baseline is calculated by a method different from the method of Embodiment 1. This is specifically described below. Description identical to that in Embodiment 1 is sometimes omitted below.

Figure 6:
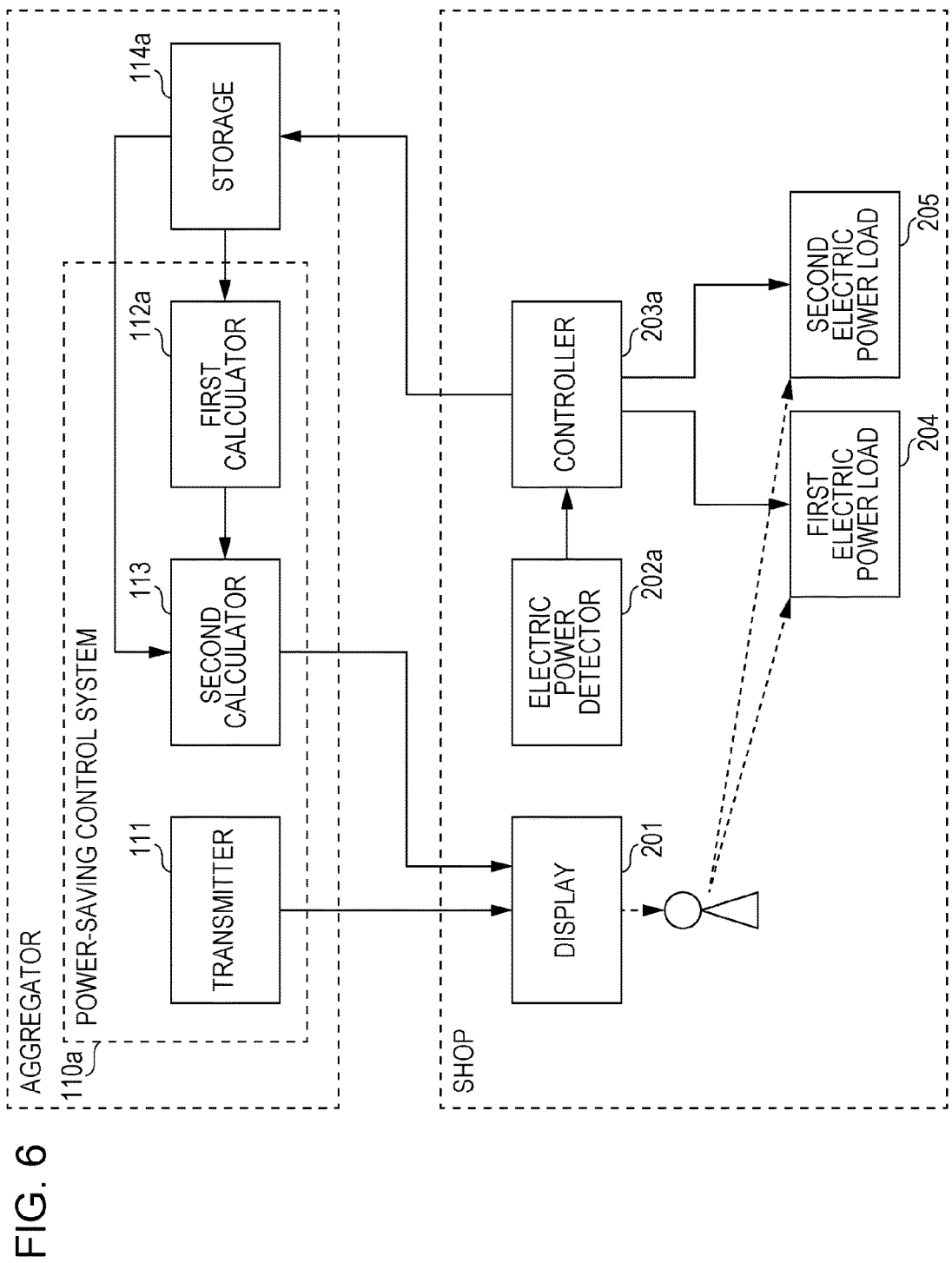
FIG. 6 is a block diagram illustrating an environment including a system according to Embodiment 2.

FIG. 6 is a block diagram illustrating an environment including a power-saving control system according to the present embodiment. In the present embodiment, a power-saving control system 110a, a first calculator 112a, a storage 114a, an electric power detector 202a, and a controller 203a are different from those in Embodiment 1. Other constituent elements are identical to those in Embodiment 1.

The first calculator 112a is an example of a first calculator according to the present disclosure and is a calculator that calculates a baseline. The first calculator 112a is basically identical to the first calculator 112 in Embodiment 1 but is different in a method for calculating a baseline. The method for calculating a baseline will be described later with reference to FIG. 8.

The storage 114a is a storage in which information is stored. The storage 114a is basically identical to the storage 114 according to Embodiment 1, but electric power information indicative of an amount of electric power consumed by a first electric power load 204 and an amount of electric power consumed by a second electric power load 205 is stored and accumulated in the storage 114a. That is, electric power information separately indicating an amount of electric power consumed by the first electric power load 204 and an amount of electric power consumed by the second electric power load 205 is stored and accumulated in the storage 114a.

For example, an amount of electric power consumed by the first electric power load 204 and an amount of electric power consumed by the second electric power load 205 are separately detected by the electric power detector 202a. Then, electric power information separately indicating the amount of electric power consumed by the first electric power load 204 and the amount of electric power consumed by the second electric power load 205 is transmitted by the controller 203a and is then stored in the storage 114a. Then, the electric power information stored in the storage 114a is used for calculation of a baseline in the first calculator 112a and calculation of a payment in the second calculator 113.

The electric power information indicating the amount of electric power consumed by the first electric power load 204 and the amount of electric power consumed by the second electric power load 205 may be information from which the amount of electric power consumed by the first electric power load 204 and the amount of electric power consumed by the second electric power load 205 can be derived. For example, the electric power information indicating the amount of electric power consumed by the first electric power load 204 and the amount of electric power consumed by the second electric power load 205 may indicate a total amount of electric power consumed by the first electric power load 204 and the second electric power load 205 and the amount of electric power consumed by the first electric power load 204.

The electric power detector 202a is a detector that detects an amount of consumed electric power and is, for example, an electric power meter placed at a shop. The electric power detector 202a is basically identical to the electric power detector 202 according to Embodiment 1 but detects an amount of electric power consumed by the first electric power load 204 and an amount of electric power consumed by the second electric power load 205.

For example, the electric power detector 202a detects an amount of electric power consumed by the first electric power load 204 and an amount of electric power consumed by the second electric power load 205 at constant time intervals. Then, the electric power detector 202a transmits, to the controller 203a, electric power information indicating the amount of electric power consumed by the first electric power load 204 and the amount of electric power consumed by the second electric power load 205.

The electric power detector 202a may detect a total amount of electric power consumed by the first electric power load 204 and the second electric power load 205 and an amount of electric power consumed by the first electric power load 204. Then, the electric power detector 202a may detects a difference between the total amount of consumed electric power and the amount of electric power consumed by the first electric power load 204 as an amount of electric power consumed by the second electric power load 205.

The controller 203a is a controller that controls an amount of consumed electric power and the like. The controller 203a is basically identical to the controller 203 according to Embodiment 1, but the controller 203a receives electric power information indicating an amount of electric power consumed by the first electric power load 204 and an amount of electric power consumed by the second electric power load 205 from the electric power detector 202a and then transmits the electric power information to an aggregator. In this way, the controller 203a causes the electric power information indicating the amount of electric power consumed by the first electric power load 204 and the amount of electric power consumed by the second electric power load 205 to be stored and accumulated in the storage 114a of the aggregator.

Figure 7:
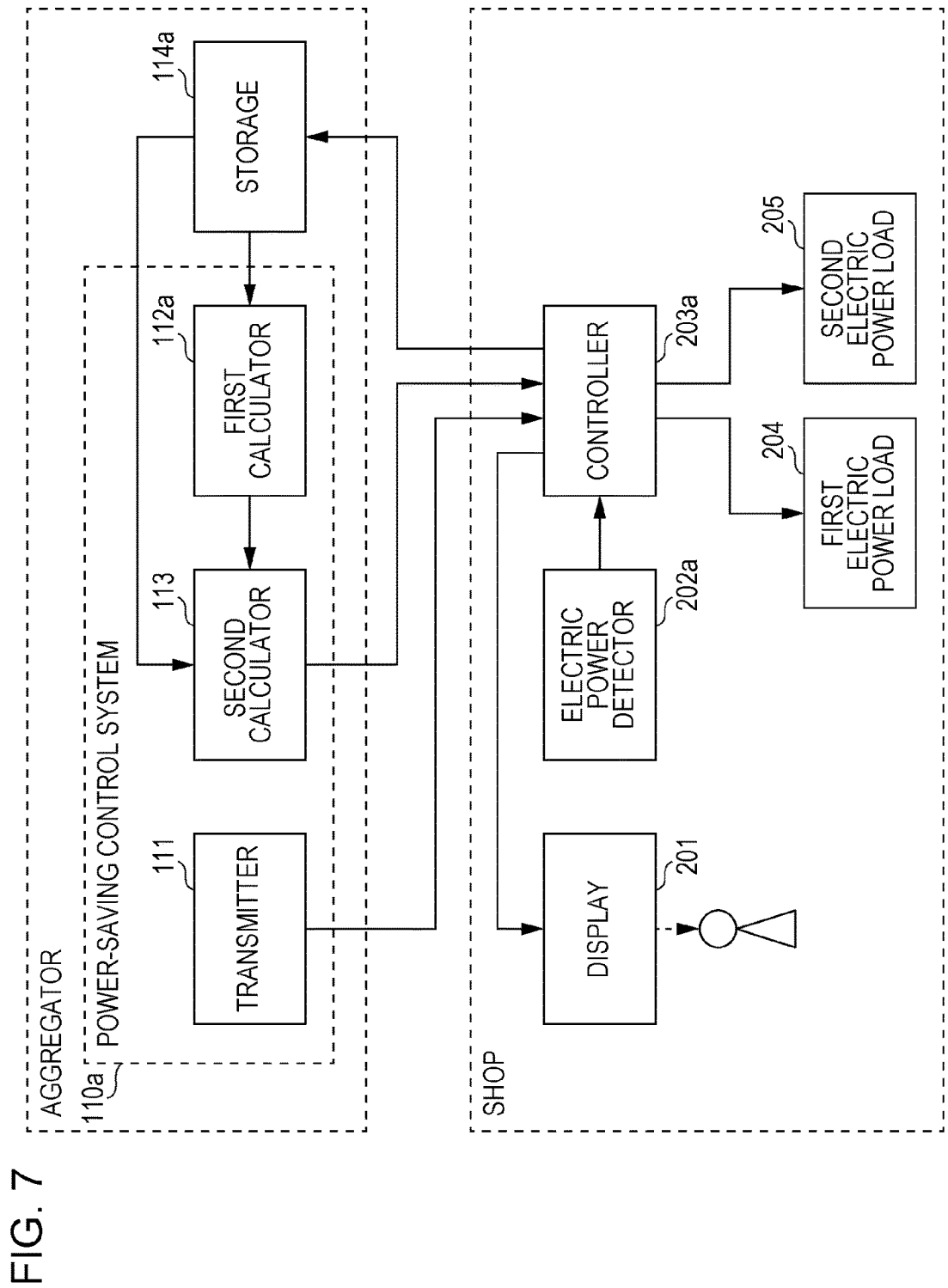
FIG. 7 is a block diagram illustrating a modification of the environment including the system according to Embodiment 2.

FIG. 7 is a block diagram illustrating a modification of the environment illustrated in FIG. 6. In the present modification, the power-saving control system 110a, the first calculator 112a, the storage 114a, the electric power detector 202a, and the controller 203a are different from those of the modification illustrated in FIG. 4. Other constituent elements are identical to those of the modification illustrated in FIG. 4. That is, a modification similar to the modification of the environment of Embodiment 1 is applicable to the environment of the present embodiment. Specifically, the present modification is identical to that of FIG. 4, and detailed description thereof is omitted.

Figure 8:
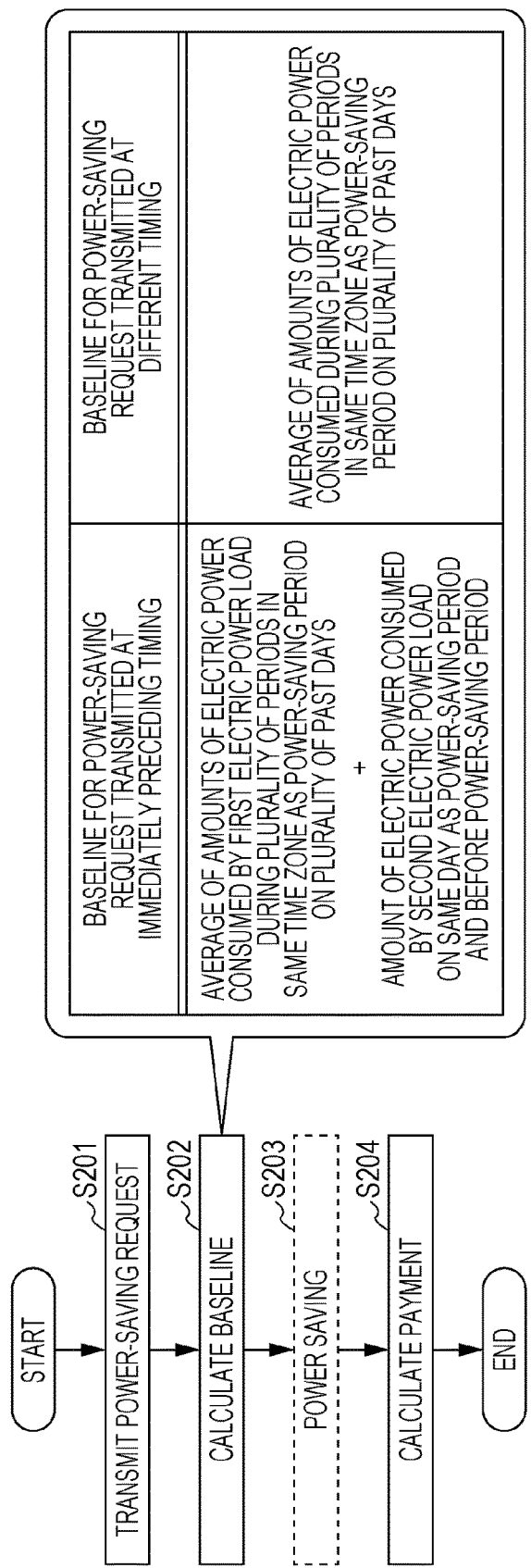
FIG. 8 is a flowchart illustrating an operation of the system according to Embodiment 2.

FIG. 8 is a flowchart illustrating an operation of the power-saving control system 110a in the environment illustrated in FIG. 6 or 7.

Transmission of a power-saving request (S201), power saving (S203), and calculation of a payment (S204) in the present embodiment illustrated in FIG. 8 are identical to transmission of a power-saving request (S101), power saving (S103), and calculation of a payment (S104) in Embodiment 1 illustrated in FIG. 5. Calculation of a baseline (S202) in the present embodiment illustrated in FIG. 8 is different from calculation of a baseline (S102) in Embodiment 1 illustrated in FIG. 5.

In calculation of a baseline (S202) illustrated in FIG. 8, the first calculator 112a calculates a baseline of an amount of electric power consumed by an electric power load during a power-saving period.

For example, the first calculator 112a calculates a baseline for a power-saving request transmitted at an immediately preceding timing based on an average (α) of amounts of electric power consumed by the first electric power load 204 and an amount (β) of electric power consumed by the second electric power load 205.

The average (α) of amounts of electric power consumed by the first electric power load 204 that is used to calculate a baseline is an average of amounts of electric power consumed by the first electric power load 204 during a plurality of periods in the same time zone as the power-saving period on a plurality of previous days. The amount (β) of electric power consumed by the second electric power load 205 that is used to calculate a baseline is an amount of electric power consumed by the second electric power load 205 on the same day as the power-saving period and before the power-saving period.

The amount (β) of electric power consumed by the second electric power load 205 that is used to calculate a baseline may be an amount of electric power consumed by the second electric power load 205 during a period immediately before the power-saving request. The period immediately before the power-saving request is, for example, a period that ends at a timing between one hour before the power-saving request and the power-saving request. The length of the period immediately before the power-saving request is, for example, 10 minutes to 6 hours. The length of the period immediately before the power-saving request may be specified based on the length of the power-saving period.

In other words, the first calculator 112a calculates a first baseline for a first power-saving period during which electric power of an electric power load is saved in accordance with a first power-saving request based on an average (α) of amounts of electric power consumed by the first electric power load 204 and an amount (β) of electric power consumed by the second electric power load 205.

The first power-saving request is a power-saving request transmitted at a timing that immediately precedes a scheduled time of the start of power saving. The average (α) of amounts of electric power consumed by the first electric power load 204 that is used to calculate the first baseline is an average of amounts of electric power consumed by the first electric power load 204 during a plurality of periods in the same time zone as the first power-saving period on a plurality of previous days. The amount (β) of electric power consumed by the second electric power load 205 that is used to calculate the first baseline is an amount of electric power consumed by the second electric power load 205 on the same day as the first power-saving period and before the first power-saving period.

The amount (β) of electric power consumed by the second electric power load 205 that is used to calculate the first baseline may be an amount of electric power consumed by the second electric power load 205 during a period immediately before the first power-saving request. The period immediately before the first power-saving request is, for example, a period that ends at a timing between one hour before the first power-saving request and the first power-saving request. The length of the period immediately before the first power-saving request is, for example, 10 minutes to 6 hours. The length of the period immediately before the first power-saving request may be specified based on the length of the first power-saving period.

The first calculator 112a may calculate a baseline for a power-saving request transmitted at an immediately preceding timing so that the baseline matches a sum of an average (α) of amounts of electric power consumed by the first electric power load 204 and an amount (β) of electric power consumed by the second electric power load 205. In other words, the first calculator 112a may calculate a first baseline for a first power-saving period during which electric power of an electric power load is saved in accordance with a first power-saving request so that the first baseline matches a sum of an average (α) of amounts of electric power consumed by the first electric power load 204 and an amount (β) of electric power consumed by the second electric power load 205.

Furthermore, the first calculator 112a calculate a baseline for a power-saving request transmitted at a timing different from the immediately preceding timing based on an average of amounts of electric power consumed by an electric power load. The average of amounts of electric power consumed by the electric power load that is used to calculate the baseline is an average of amounts of electric power consumed by the first electric power load 204 and the second electric power load 205 during a plurality of periods in the same time zone as the power-saving period on a plurality of previous days.

In other words, the first calculator 112a calculates a second baseline for a second power-saving period during which electric power of an electric power load is saved in accordance with a second power-saving request based on an average of amounts of electric power consumed by the electric power load. The second power-saving request is a power-saving request transmitted at a timing different from the previously preceding timing. The average of amounts of electric power consumed by the electric power load that is used to calculate the second baseline is an average of amounts of electric power consumed by the first electric power load 204 and the second electric power load 205 during a plurality of periods in the same time zone as the second power-saving period on a plurality of previous days.

The first calculator 112a may calculate a baseline for a power-saving request transmitted at a timing different from the immediately preceding timing so that the baseline matches an average of amounts of electric power consumed by an electric power load during a plurality of periods in the same time zone as a power-saving period on a plurality of previous days. In other words, the first calculator 112a may calculate a second baseline for a second power-saving period during which electric power of an electric power load is saved in accordance with a second power-saving request so that the second baseline matches an average of amounts of electric power consumed by the electric power load during a plurality of periods in the same time zone as the second power-saving period on a plurality of previous days.

As a result of the above operation, in calculation of a baseline for a power-saving request transmitted at an immediately preceding timing, an average of amounts of consumed electric power on a plurality of previous days is used as for an electric power load for which a fluctuation in amount of consumed electric power is large, and an amount of consumed electric power on the same day as (at a timing close to) the power-saving period is used as for an electric power load for which a fluctuation in amount of consumed electric power is small. Furthermore, an average of amounts of consumed electric power on a plurality of previous days is used in calculation of a baseline for a power-saving request transmitted at a timing different from the immediately preceding timing.

This allows the power-saving control system 110a to properly calculate a baseline based on two kinds of characteristics of an amount of consumed electric power and a period from issuance of a power-saving request to the start of a power-saving period. This allows the power-saving control system 110a to properly evaluate an amount of saved electric power and properly calculate a payment.

As in Embodiment 1, a day on which an amount of consumed electric power is small may be excluded in calculation of an average of amounts of consumed electric power. For example, the first calculator 112a may calculate a baseline based on an average of amounts of electric power consumed by an electric power load during four periods in the same time zone as a power-saving period on four days on which an amount of electric power consumed by the electric power load during a period in the same time zone as the power-saving period is large among past five days. The amount of electric power consumed by the electric power load may be an amount of electric power consumed by the first electric power load 204 or may be an amount of electric power consumed by the first electric power load 204 and the second electric power load 205.

This is highly likely to exclude an excessively small amount of consumed electric power during a period of a defrosting operation of a cooling apparatus from information for calculation of the baseline. Therefore, the power-saving control system 110a can more properly prevent a baseline from becoming too small because of a defrosting operation of a cooling apparatus.

As described above, a power-saving control system and the like according to the present disclosure can properly evaluate an amount of saved electric power.

In the above embodiments, each of the constituent elements may be realized by dedicated hardware or may be realized by executing a software program suitable for the constituent element. Each of the constituent elements may be realized by causing a program executing unit such as a CPU or a processor to read out and execute a software program recorded in a recording medium such as a hard disc or a semiconductor memory. Software realizing the power-saving control system and the like according to each of the above embodiment is the following program.

Specifically, the program causes a computer to execute a method including: (a) transmitting, to a consumer, a power-saving request requesting the consumer to start power saving at a plurality of timings; (b) calculating a baseline of an amount of electric power consumed by an electric power load during a power-saving period during which the consumer saves electric power of the electric power load in accordance with the power-saving request; and (c) calculating a payment for the consumer based on a difference between an actual amount of electric power consumed by the electric power load of the consumer during the power-saving period and the baseline, wherein in the (b) calculating, a first baseline for a first power-saving period during which the consumer saves electric power of the electric power load in accordance with a first power-saving request transmitted at a timing that immediately precedes a scheduled time of start of power saving among the plurality of timings is calculated based on an average of amounts of electric power consumed by the electric power load during a plurality of periods in a same time zone as the first power-saving period on a plurality of previous days, and wherein in the (b) calculating, a second baseline for a second power-saving period during which the consumer saves electric power of the electric power load in accordance with a second power-saving request transmitted at a timing different from the timing that immediately precedes the scheduled time of the start of power saving among the plurality of timings is calculated based on an average of amounts of electric power consumed by the electric power load during a plurality of periods in a same time zone as the second power-saving period on a plurality of previous days.

In the above embodiments, each of the constituent elements may be a circuit. The plurality of constituent elements may constitute a single circuit as a whole or may constitute respective separate circuits. Each of the circuits may be a general-purpose circuit or may be a dedicated-purpose circuit.

A power-saving control system and the like according to one or more aspects have been described above based on the embodiments, but the present disclosure is not limited to the embodiments. Various modifications of the present embodiment which a person skilled in the art can think of and combinations of constituent elements in different embodiments are also encompassed within the scope of the one or more aspect without departing from the scope of the present disclosure.

For example, in each of the above embodiments, a process performed by a specific constituent element may be performed by another constituent element instead of the specific constituent element. The order of a plurality of processes may be changed, or a plurality of processes may be performed in parallel.

The present disclosure can be used as a power-saving control system and is applicable, for example, to a demand response system for controlling supply-demand balance.

What is claimed is:

1. A power-saving control method comprising:
    transmitting, to a consumer, a first power-saving request and a second power-saving request requesting the consumer to start power saving of electric power consumed by an electric power load in a power-saving period, the first power-saving request being transmitted within a predetermined period immediately preceding the power-saving period, and the second power-saving request being transmitted before the predetermined period, the electric power load comprising a first electric power load including a cooling apparatus, and a second electric power load different from the first electric power load;
    calculating a first baseline for the power-saving period in accordance with the first power-saving request, the first baseline being calculated based on a first amount, which is an average of amounts of electric power consumed by the first electric power load during a plurality of periods on a plurality of days previous to a day including the power-saving period, each of the plurality of periods being a same time period as the power-saving period, and a second amount of electric power consumed by the second electric power load during a period before the power-saving period on the day including the power-saving period;
    calculating a second baseline for the power-saving period in accordance with the second power-saving request, the second baseline being calculated based on a third amount, which is an average of amounts of electric power consumed by the first electric power load and the second electric power load during the plurality of periods on the plurality of days previous to the day including the power-saving period;
    reducing electric power consumed by electric power load during the power-saving period in accordance with the first power-saving request or the second power-saving request;
    acquiring an actual amount of electric power consumed by the electric power load during the power-saving period, during which the electric power consumed by the electric power load is reduced; and calculating a payment for the consumer based on a difference between the actual amount of electric power consumed by the electric power load during the power-saving period and one of the first baseline and the second baseline.

2. The power-saving control method according to claim 1, wherein
the second electric power load includes an air conditioner.

3. The power saving control method according to claim 1, wherein the first baseline is calculated by adding the first amount and the second amount.

4. The power saving control method according to claim 1, wherein the period to calculate the second amount is the predetermined period immediately preceding the power-saving period.

5. A power-saving control system comprising:
a transmitter that transmits, to a consumer, a first power-saving request and a second power-saving request requesting the consumer to start power saving of electric power consumed by an electric power load in a power-saving period, the first power-saving request being transmitted within a predetermined period immediately preceding the power-saving period, and the second power-saving request being transmitted before the predetermined period, the electric power load comprising a first electric power load including a cooling apparatus, and a second electric power load different from the first electric power load;
a memory that stores instructions;
a processor that, when executing the instructions stored in the memory, performs operations including:
calculating a first baseline for the power-saving period in accordance with the first power-saving request, the first base line being calculated based on a first amount, which is an average of amounts of electric power consumed by the first electric power load during a plurality of periods on a plurality of days previous to a day including the power-saving period, each of the plurality of periods being a same time period as the power-saving period, and a second amount of electric power consumed by the second electric power load during a period before the power-saving period on the day including the power-saving period; and
calculating a second baseline for the power-saving period in accordance with the second power-saving request, the second baseline being calculated based on a third amount, which is an average of amounts of electric power consumed by the first electric power load and the second electric power load during the plurality of periods on the plurality of days previous to the day including the power-saving period,
wherein electric power consumed by electric power load is reduced during the power-saving period in accordance with the first power-saving request or the second power-saving request, the processor further performs operations including:
acquiring an actual amount of electric power consumed by the electric power load during the power-saving period, during which the electric power consumed by the electric power load is reduced; and
calculating a payment for the consumer based on a difference between the actual amount of electric power consumed by the electric power load during the power-saving period and one of the first baseline and the second baseline.

6. The power saving control system according to claim 5, wherein the first baseline is calculated by adding the first amount and the second amount.

7. The power saving control system according to claim 5, wherein the period to calculate the second amount is the predetermined period immediately preceding the power-saving period.

* * * * *